Sept. 23, 1958 P. J. LINK ET AL 2,853,299
LAYBOY
Filed April 5, 1954 11 Sheets-Sheet 1

Fig. 1.

Inventors
Peter J. Link
Douglas G. Nelson
By Soans, Glaister & Anderson
Attorneys Sept. 23, 1958  P. J. LINK ET AL  2,853,299
LAYBOY
Filed April 5, 1954  11 Sheets-Sheet 4

Sept. 23, 1958 P. J. LINK ET AL 2,853,299
LAYBOY
Filed April 5, 1954 11 Sheets-Sheet 6

Inventors
Peter J. Link
Douglas G. Nelson
By
Soans, Glaister & Anderson
Attorneys

United States Patent Office 2,853,299
Patented Sept. 23, 1958

2,853,299

LAYBOY

Peter J. Link, Neenah, Wis., and Douglas G. Nelson, Lewiston, N. Y., assignors, by mesne assignments, to Kimberly-Clark Corporation, a corporation of Delaware Application April 5, 1954, Serial No. 421,151

16 Claims. (Cl. 271—88)

This invention relates generally to layboys used in the stacking of paper sheets and the like as they are discharged from the cutting machine, and is more particularly directed to the improvement of continuous layboys which include a retractable support operable to receive the oncoming sheets while a finished stack is being removed.

In the formation of paper sheets there is usually provided a layboy for stacking the sheets as they are discharged from the cutter. In order to accommodate the rapid pace of the cutter, it is desirable that the layboy be capable of continuously receiving cut sheets of paper at a rapid rate and without the necessity of shutting down the machine each time a stack of predetermined quantity is finished. The latter feature is found in the so-called continuous type of layboy, wherein a temporary support is provided for the oncoming sheets upon the completion of a stack in order that the finished stack can be removed.

It is particularly troublesome to attempt to stack lightweight paper with a layboy of the type described. The light paper sheets tend to float into the layboy, and consequently, there is considerable difficulty in inserting some form of temporary or substitute support for the oncoming sheets, once a pile is finished, without fouling the unsettled sheets at the top of the lower pile and at the bottom of the upper pile which is beginning to be formed.

The primary object of the present invention is to provide an improved method of continuously forming a stack of sheets on a vertically movable support from sheet material being successively delivered to the support. A further object is to provide an improved layboy construction, including means for holding a pair of sheets in the layboy in spaced relation to each other, to thereby permit the insertion of a support means therebetween. Other objects and advantages of this invention will become apparent as the disclosure progresses with respect to the accompanying 11 sheets of drawings, wherein:

Figure 1:
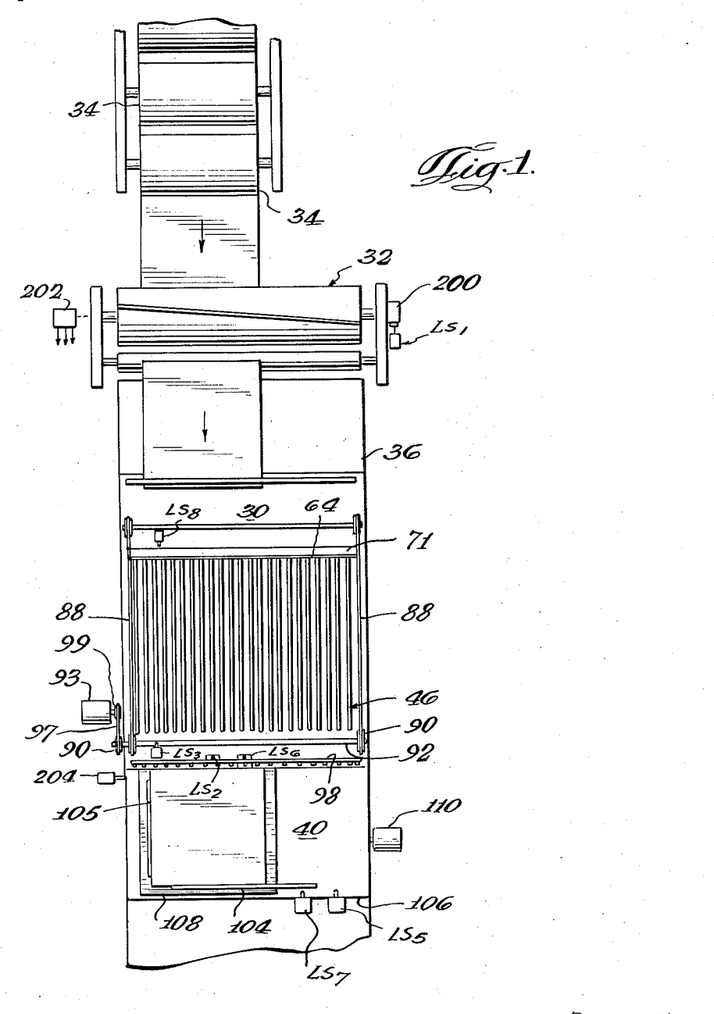
Figure 1 is a diagrammatic plan view of a cutter-layboy embodying the principles of the present invention.

Referring particularly to Figure 1, it is seen that the principles of the present invention will be described with respect to a cutter-layboy 30 for use in converting rolled paper into sheet form. Generally, the illustrated machine comprises a cutter 32 which receives paper from one or more rolls 34 and severs it into sheets or "cuts" of predetermined length for delivery on to a conveyor 36. Where a plurality of rolls are being handled, each "cut" may comprise several sheets of paper. The conveyor 36, which preferably comprises a plurality of endless belts 38 (Figure 3), delivers the sheet in a rapid succession to the layboy 40 which stacks the paper in a vertical pile. For the purpose of this description the cutter end of the machine will be considered to be the rear, whereas the layboy end will be termed the forward end of the machine.

The present invention is concerned primarily with a novel and improved means for providing a support for the oncoming sheets at the layboy while a finished stack is being removed therefrom. Further, the invention is concerned with providing such a support which is particularly useful in connection with limp, lightweight paper, which tends to float and bend and therefore does not afford a clear space between succeeding sheets or "cuts" for insertion of a temporary seupport.

Broadly the invention solves the above problem of continuously stacking sheets, as they are successively moved to a given position, by providing a plurality of clamps 44 (Figure 2) which are associated with a plurality of extensible fingers 46 in a manner such that, prior to extension of the fingers 46, the clamps move into position between trailing edges of succeeding sheets to hold the sheets in vertically spaced relation, while the fingers 46 move into their pile supporting position.

Figure 3:
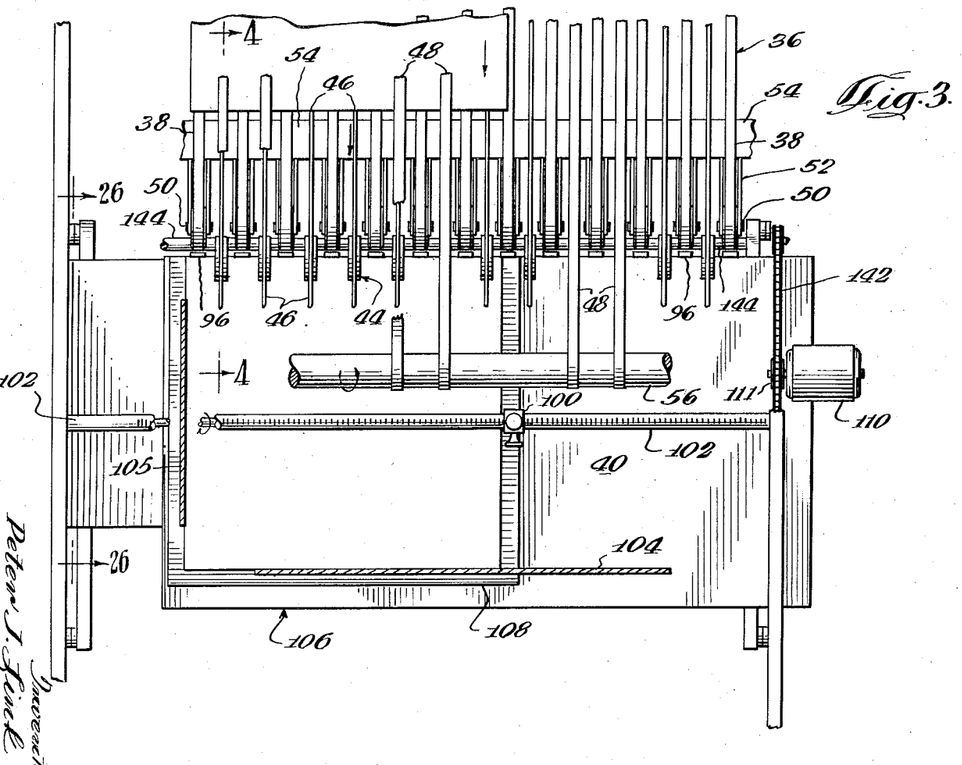
Figure 3 is a plan view of the layboy, with parts broken away.
Figure 4:
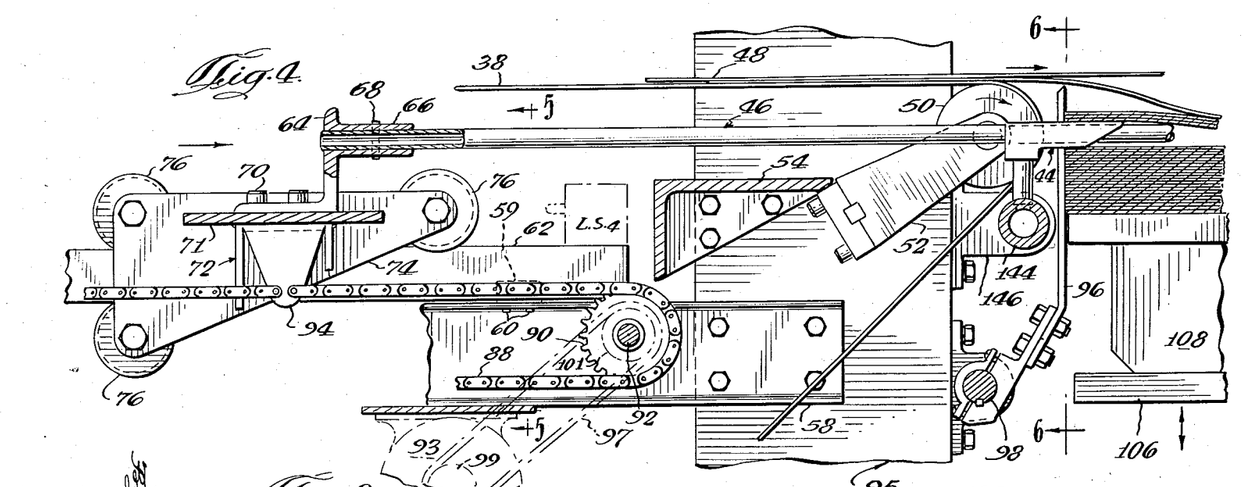
Figure 4 is a enlarged sectional view taken on line 4—4 in Figure 3.

Referring first to Figures 3 and 4, a detailed explanation of one embodiment of the invention will be presented. As indicated above, the conveyor 36 comprises a series of laterally spaced carrier belts 38 which terminate adjacent the edge of the layboy, and a series of overlying endless hold-down belts 48 which extend to a position overlying the layboy and prevent vertical displacement of the sheets as they are moved along the conveyor. As noted in Figure 4, the carrier belts 38 are each disposed around a pulley or roller 50 which is rotatably supported on the free end of an arm 52 fixed to a cross frame member 54 of the cutter-layboy machine. The hold-down belts 48 terminate around an elongated roller 56 which extends across the layboy 40 adjacent the mid-portion thereof. Suitable drive means (not shown) is provided for the conveyor belts.

The conveyor 36 includes a supporting frame structure having a pair of spaced apart, elongated side members 58 (Figure 4) which also support the fingers 46 for movement relative to the layboy 40. Looking also at Figure 5, side frame members 58 have secured thereto, as by a series of brackets 59 held in place by bolts 60, a rail 62 which is disposed inwardly of and parallel to the side frame members.

The rails 62 provide a track for guided movement of the structure mounting the fingers 46. More particularly, the fingers 46 each comprise an elongated tubular member, disposed below and between adjacent pairs of the conveyor carrier belts 38, the tubular members being fixed on a transversely positioned member 64 to extend in the direction of the layboy.

Figure 5:
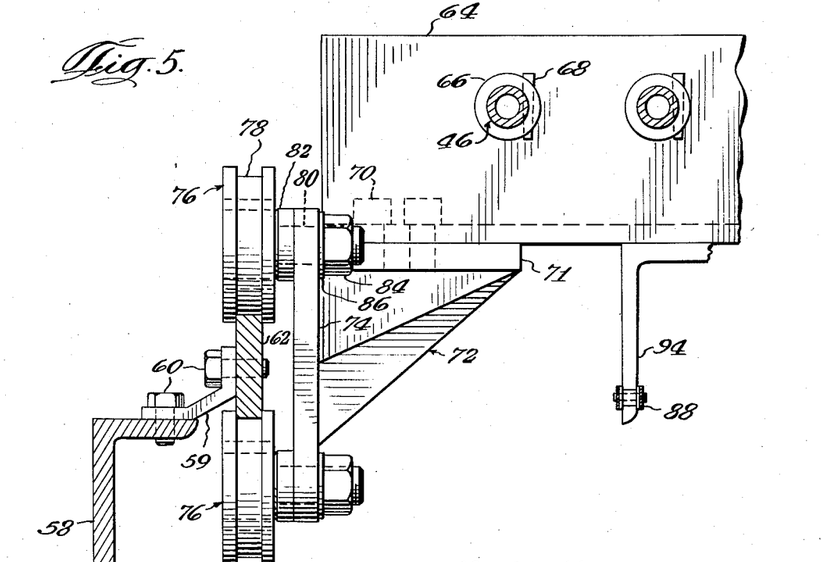
Figure 5 is an enlarged sectional view along the line 5—5 in Figure 4.
Figure 6:
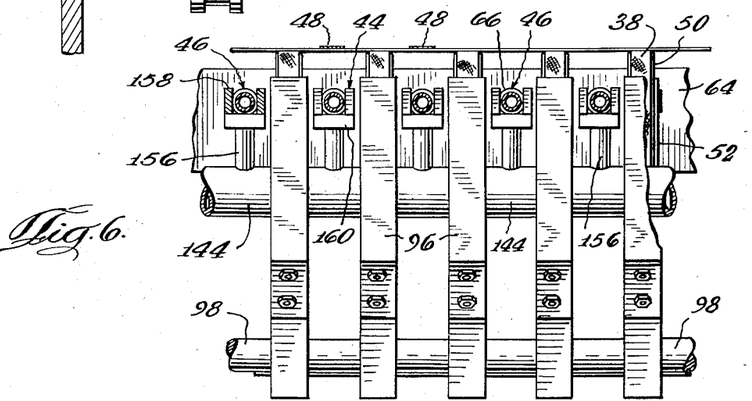
Figure 6 is a sectional view taken along the line 6—6 in Figure 4.

The cutter end of each of the fingers 46 is inserted in a complementary, short tubular element 66 fixed to the transverse member 64 to provide a supporting socket for the finger. A pin or key 68 is inserted in aligned recesses in the finger 46 and the socket element 66 to prevent axial movement of the finger. The transverse member 64 supporting the fingers 46 is an angle member having its horizontal flange secured at its opposite ends, as by bolts 70, to the horizontal flange portion 71 of a supporting bracket 72, which is fixed to a vertically disposed, triangular plate member 74. Each of the triangular plate members 74, only one of which is shown, provides a trolley support for the fingers and has at each of its apexes a roller 76 engaging the guide rail 62 (Figure 5). More particularly, each roller includes a grooved wheel 78, a spindle 80 extending through an opening in the plate 74, a spacer element 82 intermediate the wheel 78 and the plate 74, a washer 86, and a nut 84 disposed on the outer threaded end of the spindle for securing the roller to the plate 74.

In order to afford controlled movement of the finger supporting trolleys along the guide rails 62, there is provided a pair of endless link-chain devices 88 (Fig. 4). The chains 88 are carried by a pair of sprockets 90 fixedly mounted on shafts 92, which are spaced longitudinally on the conveyor frame members 58 and suitably rotatably mounted thereon. Each of the drive chains are fixed to the lower end of an angle bracket 94 which depends from the transverse member 64 supporting the fingers 46. Suitable means, such as the reversible motor 93 seen in Fig. 4, is provided for driving one of the shafts 92, as by a chain belt 97 which is drivingly connected between a sprocket 99 on the motor shaft and a sprocket 101 on the forward shaft 92. Thus there is provided movement of the finger-supporting trolleys to and fro along the guide rails 62, to thereby effect the extension and withdrawal of the fingers relative to the layboy.

The layboy portion of the illustrated machine is disposed at the terminal end of the conveyor 36 and includes a suitable frame structure 95 which also serves to support the forward end of the conveyor. The layboy 40 includes a series of rear joggers 96 mounted on a shaft 98 for oscillation in the direction of movement of the sheets, a side jogger 100 (Figure 3) which is adjustably mounted on a shaft 102 for oscillation in a direction transversely of the path of sheet movement, an adjustably positionable front stop plate 104, a side stop plate 105, and a main receiving table 106 which is mounted for vertical movement relative to a position closely underlying the plane of the conveyor carrier belts 38. The rear joggers 96 and the side jogger 100 function in the usual manner to cooperate with the front stop plate 104 and the side stop plate 105 in forming an even stack of sheets on the main receiving table 106.

The main receiving table 106 is supported from the layboy frame, as by means of the endless chain 142 (Fig. 3), for vertical movement with respect to the path of travel of the sheets moving along the conveyor 36. Suitable means, such as a reversible motor 110 having a drive sprocket 111 engaging the chain 142, is provided for lowering the table 106 as the stack of sheets is being built up thereon. A separable support or skid 108 is preferably mounted on the table 106 to receive the sheets from the conveyor 36, in order to facilitate removal of the completed stack from the layboy.

Figure 19:
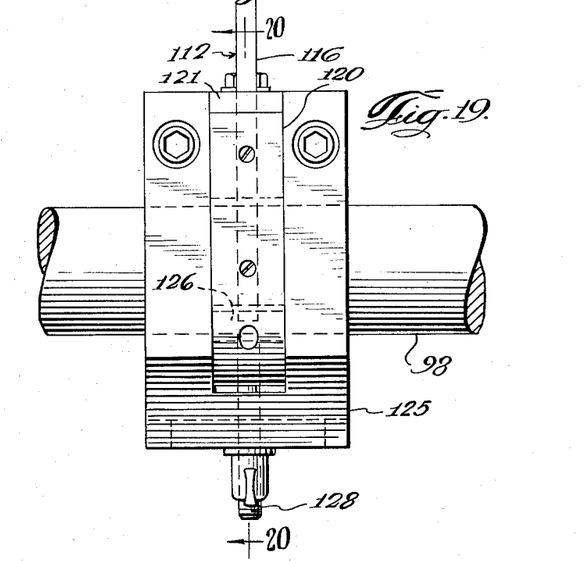
Figure 19 is a fragmentary view of one of the control elements for the layboy, seen generally in Figure 2.
Figures 20, 21:
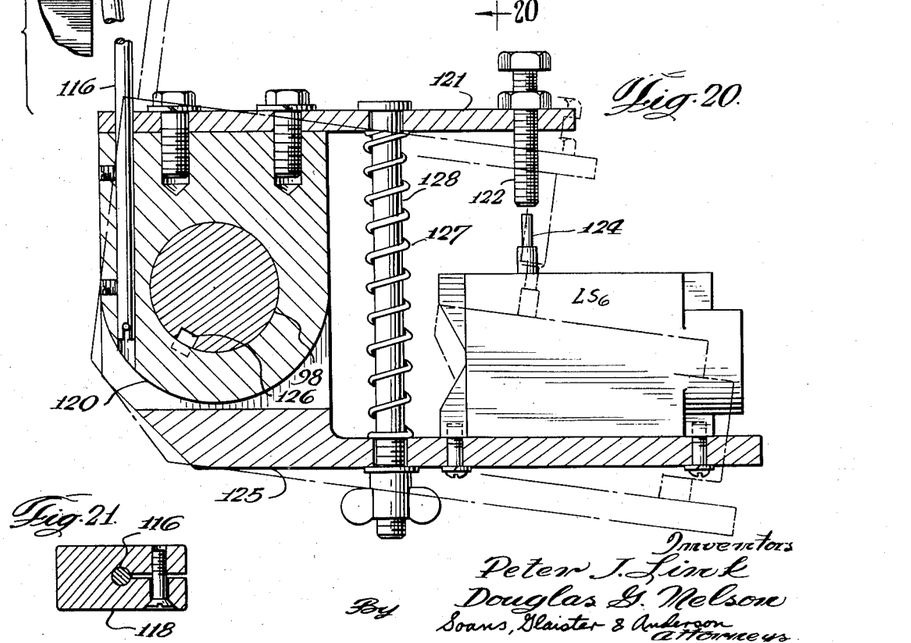
Figure 20 is a sectional view taken along the line 20—20 in Figure 19.
Figure 21 is a section along the line 21—21 in Figure 20.

The raising and lowering of the table 106 is controlled by means of a pair of control elements 112 and 114 (Fig. 2) which are connected with the motor 110 through limit switches LS–6 and LS–2, respectively. The control element 112 (Figs. 19–21) comprises a rod 116 having an aluminum knob 118 or the like mounted on the upper end thereof. The lower end of the rod 116 is fixed to a collar 120 which is rotatably mounted on the rear jogger shaft 98. A rearwardly extending plate member 121 is fixed to the upper portion of the collar 120, and this plate carries a screw or the like 122 which extends downwardly in position for engagement with an operating button 124 for the limit switch LS–6.

The limit switch LS–6 is carried by a rearwardly extending section of a yoke member 125 which has spaced-apart portions fixed to the jogger shaft 98 on opposite sides of the collar 120. The yoke 125 is fixed to the shaft 98, as by a key 126, for rotation therewith. Relative movement between the yoke 125 and the collar 120 is yieldingly resisted by means of the coil spring 127 carried by a rod 128 which extends between the plate 121 on the collar and the rearwardly extending portion of the yoke 125. As the aluminum knob 118 strikes the pile of sheets on the layboy table 106, the knob supporting rod 116 and its supporting collar 120 are held back away from the pile while the jogger shaft 98 continues to oscillate. This effects relative movement between the plate 121 and the yoke 125, against the action of the spring 127, to thereby move the screw 122 against the button 124 and close the switch LS–6. The motor 110 is thus actuated to lower the table 106.

As the pile of sheets on the table 106 moves below the knob 118, the latter moves forward to again open the switch LS–6, by moving the screw 122 upwardly away from the switch button 124. This stops the motor 110 and halts the lowering movement of the layboy table 106. In this manner, the table 106 is repeatedly lowered and then halted, in order to maintain the top of the pile of sheets at a predetermined level.

Figures 22, 23:
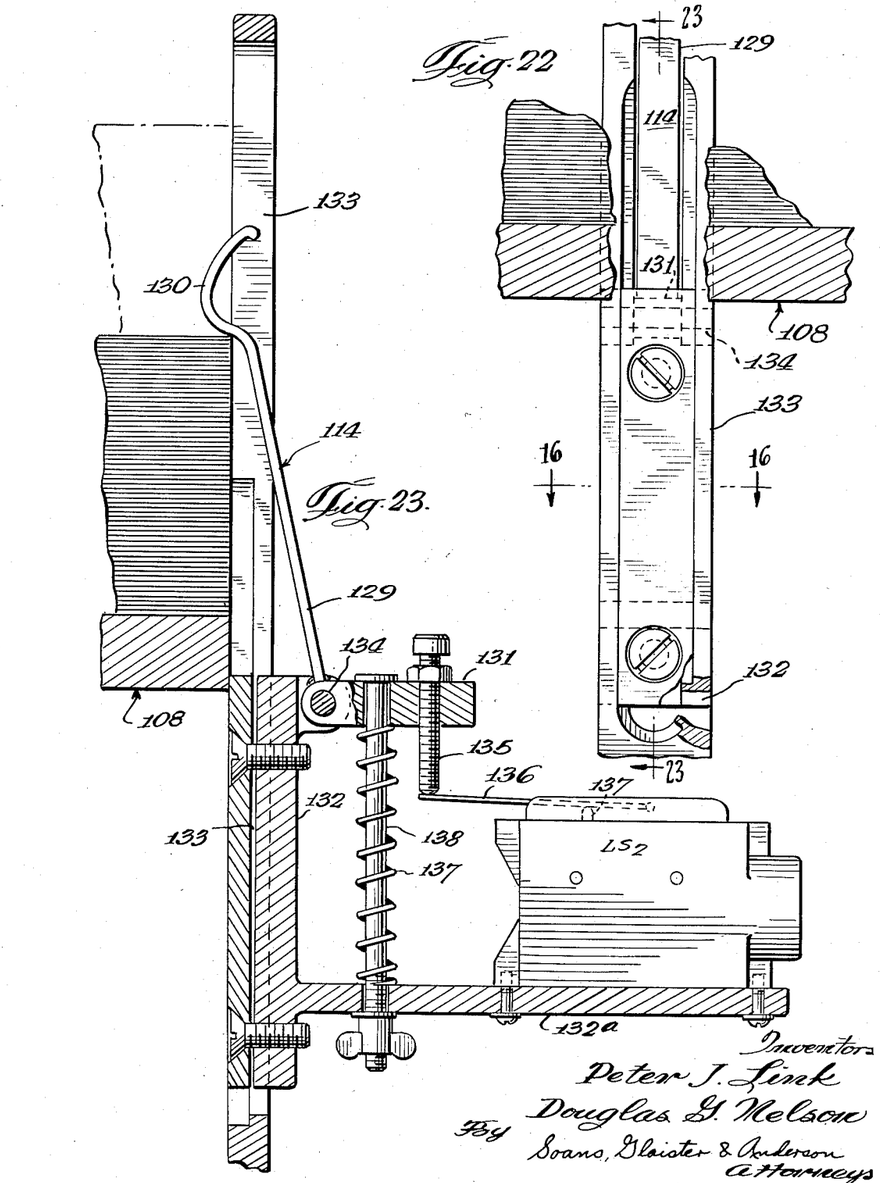
Figure 22 is a fragmentary view of another of the control elements for the layboy in Figure 2, with parts broken away.
Figure 23 is a sectional view taken along the line 23—23 in Figure 22.

The control 114 (Fig. 23) is effective to initially lower the layboy table 106 an amount sufficient to permit movement of the clamps 44 into a position overlying the pile of sheets on the table, as will be more fully described later, and for lowering the table 106 once a predetermined number of sheets have been accumulated on the table. The control element 114 includes a vertically extending rod 129 having an upper portion 130 which is curved inwardly toward the table 106. The lower end of the rod is fixed to an arm 131 which is rotatably mounted on a bracket 132 secured to a frame member 133 adjacent the jogger shaft 98. Specifically, the bracket 132 supports a cross pin 134, and the arm 131 is rotatably mounted on the cross pin. The lower end 132a of the bracket 132 has fixed thereto a limit switch LS–2 which is controllably connected with the layboy table motor 110.

The arm 131 includes a switch operating means in the form of a screw 135, which is disposed for engagement with the free end of a pivotally mounted strap 136 overlying the push button 137 for the limit switch LS–2. Relative movement between the arm 131 and the bracket 132a is yieldingly resisted by a coil spring 137 disposed around a rod 138 which extends between the arm and the bracket. The upper curved portion 130 of the control rod 129 is thereby urged in the direction of the pile on the layboy and is responsive to the vertical disposition of the stack of sheets on the table 106 to open and close the limit switch LS–2. As the pile of sheets reaches a position wherein movement of the curved portion 130 into a position overlying the pile is permitted, the limit switch LS-2 and the motor 110 connected therewith are actuated by the resulting upward movement of the screw 135 to lower the table 106 to a position wherein the pile of sheets can be readily removed from the table.

In order to provide for continuous operation of the layboy while a stack of sheets on the skid 108 are being moved from the lowered table 106, the aforementioned finger structure 46 is provided to afford a temporary support for the oncoming sheets. And in order to insure proper insertion of the fingers 46 between succeeding sheets, a mechanism including the clamps 44 is provided.

Figure 2:
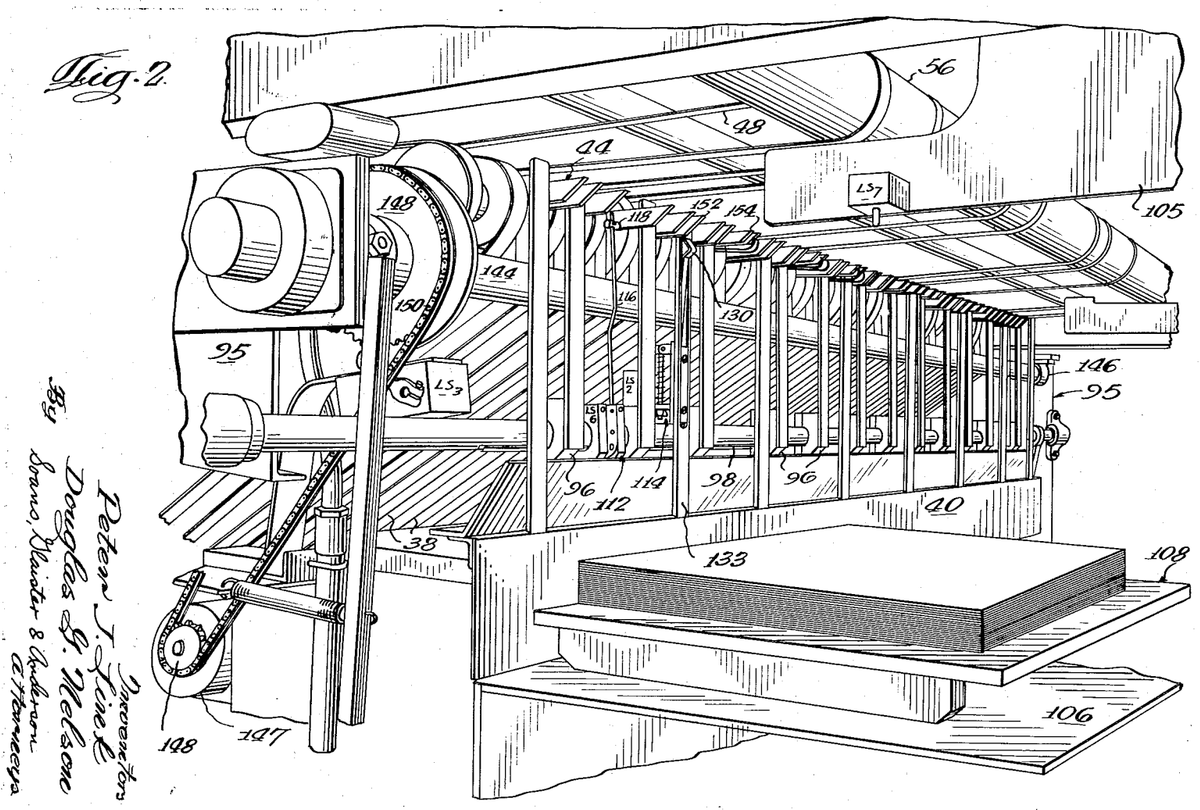
Figure 2 is a fragmentary perspective view of the layboy, looking toward the cutter.

Referring generally to Figures 2 and 4, it is seen that the layboy clamps 44 are fixed to a shaft 144. The shaft 144 is disposed transversely of the conveyor 36 and is rotatably mounted in brackets 146 which are secured to the cutter-layboy frame 95. A clamp is associated with the forward end of each of the extensible fingers 46. Suitable means, including a motor 147 which is drivingly connected to a sprocket 148 (Fig. 2) at one end of the shaft 144 through a chain 140, is provided for effecting a rotation of the shaft 144.

Figure 7:
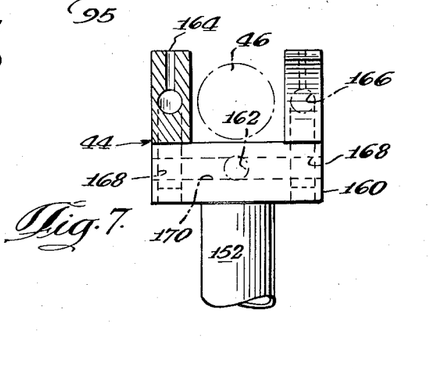
Figure 7 is an enlarged end view, partly in section, of the vacuum clamp shown particularly in Figures 4 and 6.
Figure 8:
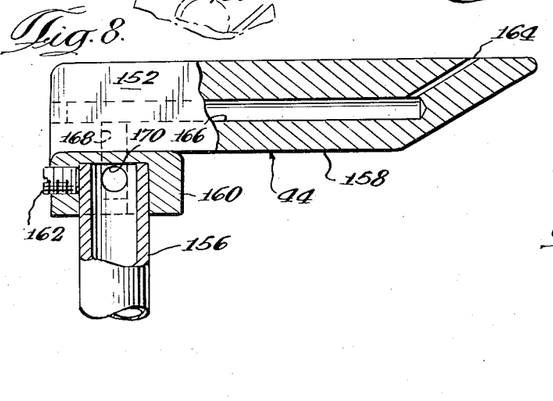
Figure 8 is a side elevation of Figure 7, with parts broken away.

As illustrated, the clamps 44 are spaced along the shaft 144 and include a plurality of vacuum clamps 152 and a plurality of spring wire clamps 154, preferably disposed alternately along the shaft. As seen in Figures 7 and 8, each of the vacuum clamps 152 comprises a tubular supporting post 156, fixed to the shaft 144 (Figure 4) in vertically extending relation thereto, and a bifurcated clamping element 158 which is fixed to the upper end of the post 156 at generally right angles thereto and extending in the direction of the layboy receiving table 106. The mounting end of the clamping element includes a base 160 having a cylindrical bore therein for receiving the upper end of the post 156, the two parts being held in engagement by the set screw 162. The forward end of each of the leg portions of the clamping element 158 is preferably tapered on the under side to permit easy insertion of the clamp in overlying relation to a stack of sheet material.

Adjacent the tip of each of the leg portions of the clamping element 158, there is provided a bore 164 extending from a longitudinally extending central passageway 166 in the leg to the upper surface thereof. The central passageway 166 extends to the rear of the clamping element 158 and communicates through a pair of vertical bores 168 with a transverse bore 170 in the base 160. The bore 170 in turn communicates with the hollow central portion of the clamp supporting post 156 which intersects the hollow center section of the transverse shaft 144. Suitable means, indicated generally at 171 in Fig. 24 and comprising a motor driven vacuum pump, is provided at one end of the shaft 144 for producing a vacuum in the communicating passages just described, to thereby effect a suction at the outer end of the bore 164 at the tips of each of the vacuum clamps 152. The utility of this feature will be explained more fully hereinafter.

Looking now to Figures 13-15, 17 and 18, it will be noted that the spring wire clamps 154 are generally similar to the vacuum clamps 152 just described. More particularly, each of the clamps 154 comprises a vertical supporting post 172, which is fixed in vertically extending relation to the transverse shaft 144, and a bifurcated clamping element 174 supported on the upper end of the post. The clamping element 174 includes a base 176 having a cylindrical socket 178 at the lower end thereof for securing the base of the clamp to the post 172. A set screw 180 is used to fix the clamping element in position.

Intermediate the rear end of the legs forming the clamping element 174 there is mounted a cam 182 (Fig. 15) which is pivotally mounted on the base portion 176, by a pin 184, in transverse relation to the longitudinal axis of the clamping element. A pair of spaced-apart spring wire elements 186 are fixed at one end to the cam 182, as by the set screws 185 (Fig. 14), and extend forwardly therefrom along the underside of each leg portion of the clamp. The forward ends of the spring elements 186 curve upwardly adjacent the tip of the clamp in position for engagement therewith. The cam 182 is biased, so as to hold the wire elements 186 in a generally horizontal plane, by a coil spring 188 interposed between a recess 190 in the lower side of the cam and a recess 192 in the upper surface of a plate 194 which is fixed, by screws 196, to the lower end of the clamp base 176. There is further provided a set screw 197 (Fig. 17) in position to provide an adjustable stop for the cam 182.

Figure 24:
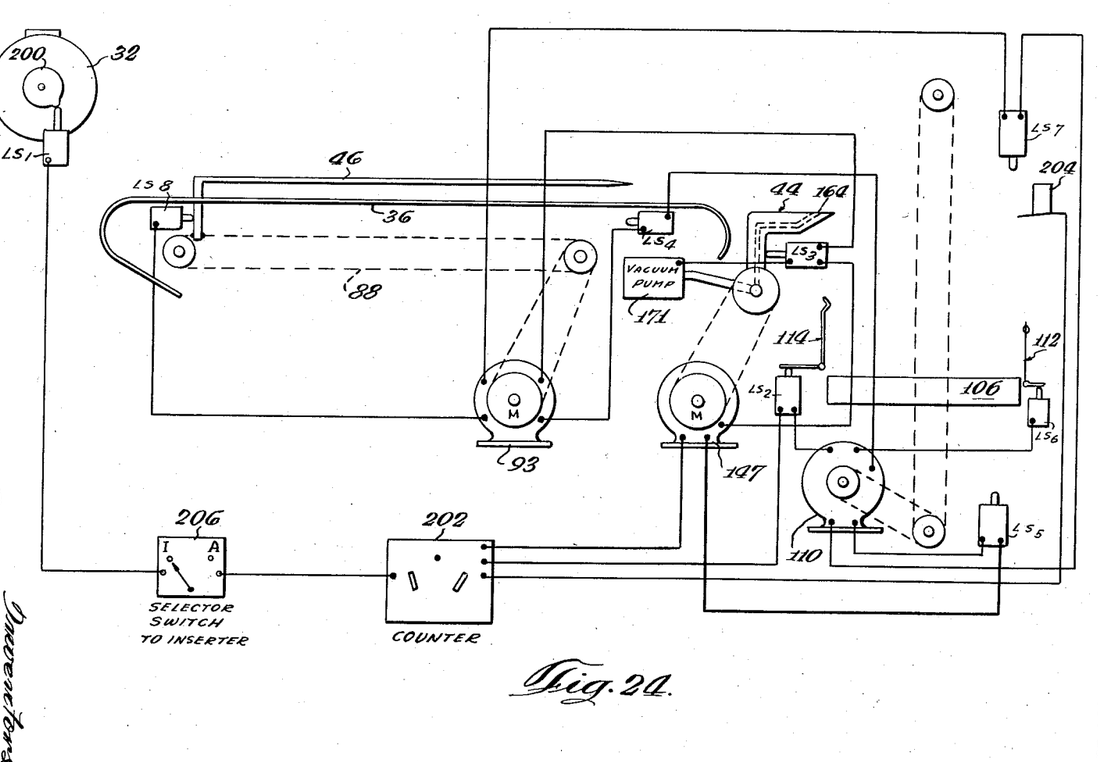
Figure 24 is a schematic illustration of the cutter-layboy arrangement embodying the present invention.

With reference particularly to the diagrammatic showing of the cutter layboy in Fig. 24, a description of the general operation of the disclosed structure will be given. As the paper from the rolls 34 (Fig. 1) is fed into the cutter 32 it is cut into sheets of predetermined size which are discharged onto the conveyor 36. The rotation of the cutter 32 and a cam 200 at one end of the supporting shaft for the knife roll operates a limit switch LS-1, so as to send impulses to a counter mechanism 202 which registers the number of sheets being cut. When the counter 202 has counted a predetermined number of sheets, it energizes an inserter mechanism 204 which places a marker strip in the sheet pile on the layboy table 106. And, in this latter respect, a selector switch 206 is preferably located in the counter circuit to afford either automatic insertion of the marker strip at a predetermined count (position "A") or actuation of the layboy mechanism to provide a transfer of a completed stack in the layboy (position "I").

The switch 206 may be moved to the "I" position at any time after the next to the last ream has been completed and the marker strip inserted. In position "I," when the counter 202 has reached a number less than the full count desired for the last ream to be placed in the layboy, for example, 3 to 5 sheets or "cuts" prior to a full ream, a signal is given by the counter. This signal transmits an impulse to the limit switch LS-2 which operates the motor 110 of the pile lowering mechanism to drop the table 106 and thereby provide sufficient clearance above the pile of sheets for entrance of the clamps 44. At the full count, the counter mechanism 202 starts the motor 147 in operation to thereby move the clamps 44 into a position overlying the pile on the layboy table 106. The clamps 44 are stopped in their movement by engagement with a limit switch LS-3 which stops the operation of the motor 147. The limit switch LS-3 at this time, performs two additional functions. It starts the motor 93 to thereby start the forward movement of the fingers 46, and the switch LS-3 also actuates the vacuum pump and motor 171 to produce a vacuum at the openings 164 in the clamps 44.

Figures 9, 10, 11, 12:
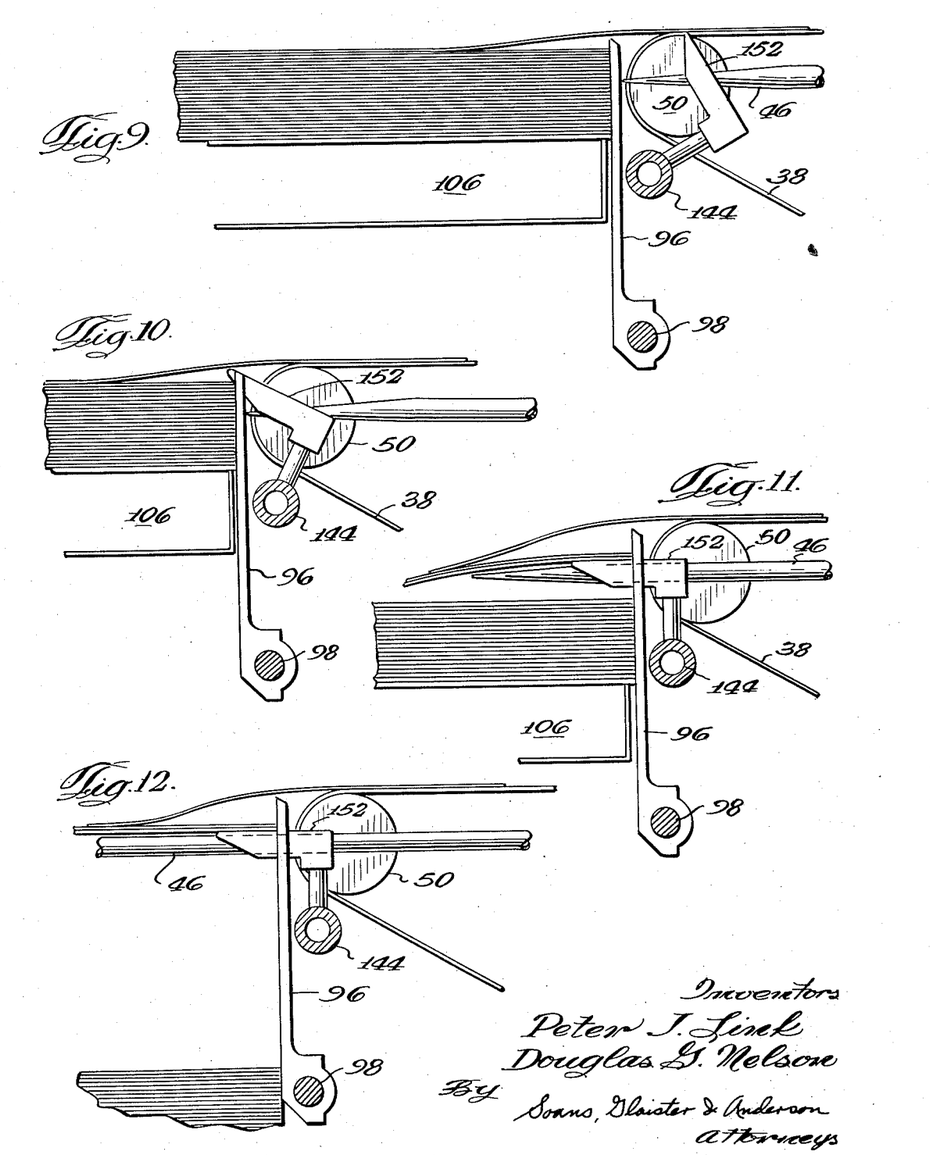
Figures 9-12 are diagrammatic illustrations of the operation of the vacuum clamp shown in Figures 7 and 8.
Figure 13:
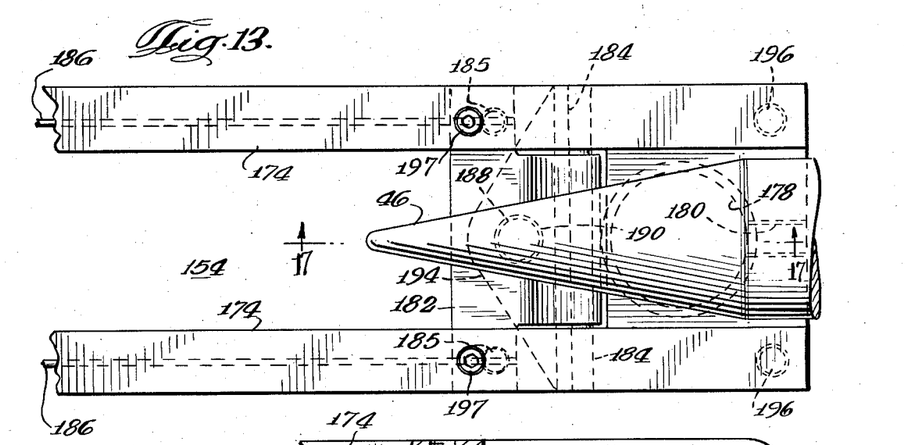
Figure 13 is an enlarged fragmentary, plan view of the wire clamps used in the layboy and seen generally in Figure 2.
Figures 14, 15, 16:
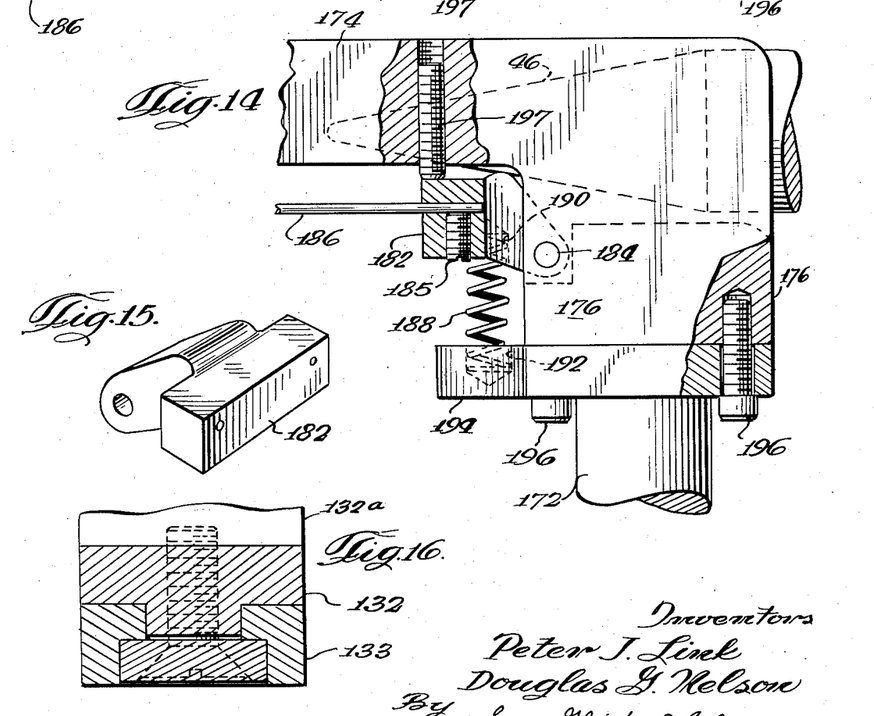
Figure 14 is a partial side view of the structure in Figure 13, with parts broken away.
Figure 15 is a perspective view of a detail of the structube shown in Figures 13 and 14.
Figure 16 is an enlarged section taken along the line 16—16 in Figure 22.
Figure 17:
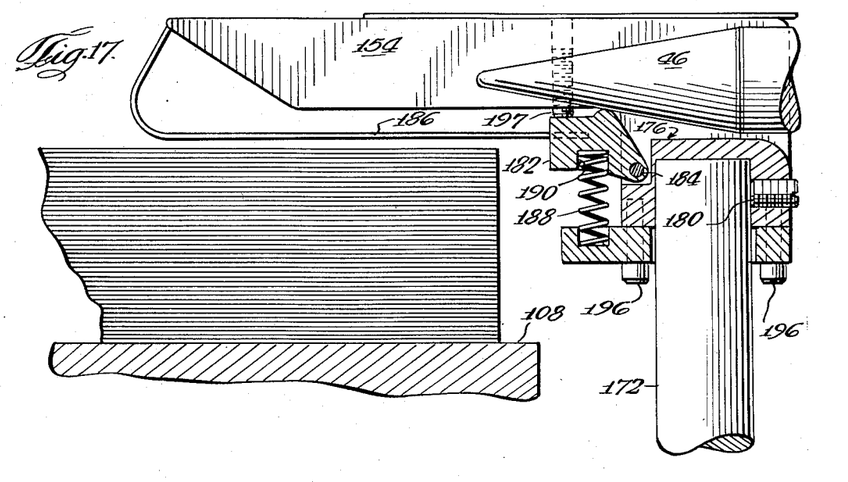
Figure 17 is a sectional view taken along the line 17—17 in Figure 13, reduced in scale.

The fingers 46 are driven toward the laybody to a position between the clamps 44 overlying the pile of sheets on the layboy table, to thereby provide a temporary support for the oncoming sheets while the completed pile on skid 108 is being removed. This forward movement of the fingers 46 is halted by means of a limit switch LS-4 (Fig. 4) which is connected to the motor 93. The limit switch LS-4 is also connected with the motor 110 so that the extension of the fingers 46 to a position overlying the layboy table 106 actuates the motor 110 to lower the table 106. The downward movement of the table 106 is halted upon engagement thereof with a limit switch LS-5 which is controllably connected to the motor 110. The limit switch LS-5 is also connected to the clamp-drive motor 147, and the latter is also actuated as the table 106 reaches its lowermost position to return the clamps 44 to their inoperative position (Fig. 9). When the completed pile is removed from the table 106, the motor 110 is then started, through a switch (not shown), to raise the table 106 to its pile receiving position.

Another limit switch LS-7, which is disposed in the path of the table 106 on the upper portion of the layboy frame, is connected to the motor 110 and halts the table 106 in a predetermined upper position. Limit switch LS-7 is also connected to the finger drive motor 93 and starts the rearward movement of the fingers 46 once the table 106 has been returned to its upper position. The retraction of the fingers 46 is halted by a limit switch LS-8 which is disposed at the cutter end of the path of movement of the fingers and is connected to the finger-drive motor 93.

Figure 18:
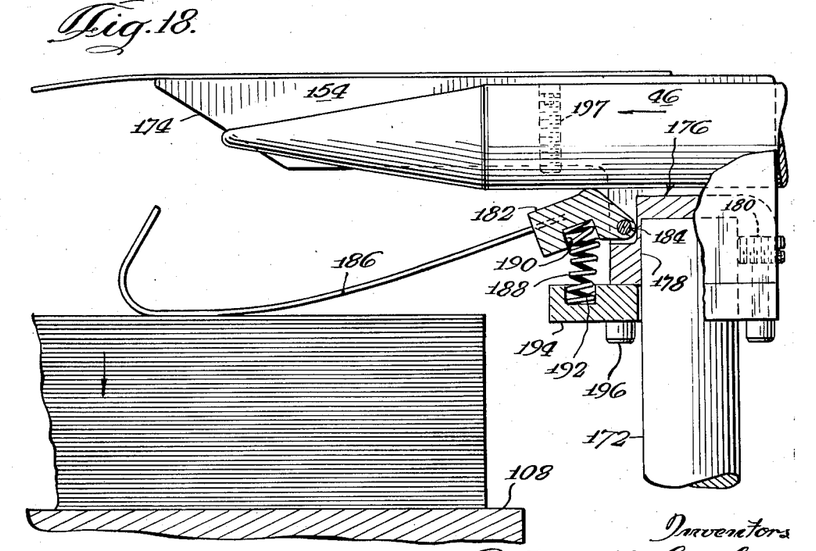
Figure 18 is a view similar to Figure 17, showing another position of the elements of the structure.

Having in mind the general operation of the entire cutter-layboy structure, it is desired to particularly point out the specific operation of the clamps 44 and the temporary supporting fingers 46. As the clamps 44 are rotated to a position overlying the pile of sheets on the layboy, they perform two very important functions. The lower portion of these clamps serve to hold the upper sheet of the completed pile in position, while the upper portion of the clamps serve to temporarily support and suitably position the oncoming sheet to afford entry of the fingers 46 between the completed pile and the succeeding sheet. In this respect, it should be noted that the clamps 154 (Figs. 17 and 18) include the springs 186 which are actuated by the forward ends of the fingers 46 to firmly engage the upper surface of the completed pile. More particularly, the forward end of each of the fingers 46 is generally conical in shape to facilitate entrance of the finger between the sheets of paper. This conical end portion of the finger 46 passes over the cam 182, as the finger moves to a position overlying the layboy table 106, and forces the springs 186 downwardly on to the stack of sheets, against the biasing action of the spring 188, as seen in Fig. 18.

The remaining clamps 152 (Figs. 7-12) include the openings 164 which communicate with the vacuum pump 171 through the passages 166, 168, 170 and the hollow clamp supporting arm 156, described above. These openings 164 serve to grasp the oncoming sheet and position it in aligned, spaced relation to the completed pile on the layboy table. Thus, the top sheet of the finished stack and the bottom sheet of the newly forming stack are held in fixed, vertically spaced relation to each other to permit insertion of the fingers 46 without disturbing either of the sheets held by the clamps. The fingers 46 can then provide a support for the oncoming sheets, while the completed stack is being removed in the above described manner. Although the two types of clamps 152 and 154 are illustrated and described, it will be apparent that the function of both types of clamps can be incorporated in a single structure having a pivotally mounted spring on the lower side and a vacuum means on the upper side. And, although the described clamps 152 and 154 rotate through 360°, the clamps can achieve similar results by being moved back and forth through a predetermined arc.

It is seen, therefore, that there is provided a novel and effective means for temporarily supporting a rapidly forming pile of sheets, so that continuous operation of the layboy is made possible. Moreover, the disclosed means positively determines the position of the oncoming sheets to facilitate extension of the fingers 46, and so that the newly forming stack can eventually be transferred to the skid 108 on the layboy table in a predetermined position thereon. The suction at the clamp openings 164 causes the clamp to grasp the first sheet of the newly forming stack and hold it in a predetermined position. Furthermore, the disposition of the clamps and the action of the springs 186 and the clamp openings 164 is such that a vertically spaced relation is maintained between the completed pile and the new forming pile, so that the fingers 46 may be readily moved into a position of support for the new pile without displacing either of the sheets held by the clamps.

Although shown and described with respect to a particular embodiment, it will be apparent that the principles of the present invention may be readily applied to other types of sheet handling equipment. And, although of particular value with respect to the handling of paper sheets, the principles of the present invention may be advantageously employed with respect to the handling of other types of sheet material, particularly wherein such sheets are limp and of relatively light weight.

We claim:

1. A method of continuously forming a stack from pieces of sheet material being successively delivered to a given station, comprising the steps of receiving the sheets on a vertically movable main support, moving the support downwardly as the stack of sheets is being built up, inserting a hold-down device on top of the stack after a predetermined number of sheets have been deposited thereon, inserting a temporary support through the opening between the formed stack and the succeeding sheet provided by said hold-down device, to thereby support the newly forming stack during the removal of the formed stack, withdrawing the hold-down device, and withdrawing the temporary support after the main support has returned to a position closely underlying the temporary support, to thereby deposit the newly forming stack on said main support.

2. A method of continuously forming stacks of sheet material, comprising the steps of successively delivering the sheets to a given station, collecting the sheets delivered to said station on a vertically movable main support, moving the support downwardly as the stack of sheets is being built up thereon, holding down the top sheet of the stack after a predetermined number of sheets have been deposited thereon by a means providing an opening along one edge of the stack between said top sheet and the succeeding sheet, inserting a temporary support for the newly forming stack through the opening in the edge of the stack, unloading the formed stack from the main support, returning the main support to a position closely underlying the temporary support, and withdrawing the temporary support to thereby deposit the forming stack on the main support.

3. A method of continuously forming stacks from pieces of sheet material, comprising the steps of successively and continuously delivering the sheets to a given station, collecting the sheets delivered to said station on a vertically movable main support, moving the main support downwardly as the height of the forming stack increases, to thereby maintain the top of the stack at a substantially constant elevation, holding the edge of the top sheet of a completed stack on the main support and the edge of the succeeding sheet in vertically spaced relation, inserting a temporary support between the top sheet of the formed stack and the succeeding sheet, removing the formed stack from the main support and returning the latter to a position closely underlying the temporary support, and withdrawing the temporary support to thereby deposit the forming stack on the main support.

4. Apparatus adapted to form a stack of sheet material being successively fed thereto comprising, a main receiving table, means for lowering said main table as the stack is built up, clamping means movable into overlying engagement with the finished stack on said main table to hold down the upper sheet thereof and to provide a wedge between said stack and the oncoming sheets, and an auxiliary table movable through the opening provided by said clamping means into position to support the oncoming sheets during the period of unloading of said main table.

5. Apparatus adapted to form a stack from pieces of sheet material being successively fed thereto comprising, a main receiving table, means for lowering said table as the height of the stack thereon increases, means movable into overlying relation to the stack at a selected period in the formation thereof, said latter means being operative to grasp a portion of the succeeding sheet and hold it in elevated relation to the stack, and an auxiliary table movable into a position between said stack and said succeeding sheet to provide a support for the oncoming sheets while the completed stack is being removed from said main table.

6. In a layboy adapted to form a stack from sheet material being successively fed thereto, a main receiving table, means for lowering said main table as the stack is built up, clamping means movable into overlying engagement with the upper sheet on the stack as the latter is completed, said clamping means also including means for engaging the succeeding sheet and holding it in vertically spaced relation to said upper sheet, and an auxiliary table movable through the opening formed by said clamping means between the upper sheet of the completed stack and the overlying sheet to support said succeeding sheet and the sheets following same into the layboy during the period of unloading of said main table.

7. In a layboy adapted to form a stack of lightweight paper sheets as the latter are successively and continuously delivered thereto, a vertically movable main receiving table, means for lowering said main table in accordance with the rate of the building up of the stack thereon, means movable into overlying relation to the upper sheet of the stack as the latter is completed, said movable means comprising a hollow element having an opening defined in the upper surface portion thereof, a suction means having communication with the opening through said hollow element, whereby the latter is operable to grasp the sheet following the upper sheet of the completed stack and to hold said following sheet in vertically spaced, fixed relation to the stack, and an auxiliary table movable in following relation to said movable means through the opening provided by the latter between the stack and said following sheet, to thereby provide a support for said following sheet and succeeding sheets during the period of unloading of said main table.

8. In a layboy adapted to form a stack of lightweight paper sheets as the latter are delivered thereto in succession, a vertically movable main receiving table, means for lowering said main table in accordance with the rate of building up the stack, clamping means movable into overlying engagement with the upper sheet on the stack as the latter is completed, said clamping means comprising a plurality of hollow tubular elements each having an opening defined in the upper surface portion thereof, a suction means having communication with the openings through the hollow portion of said clamping means, whereby said clamping means is operable to hold down the upper sheet of the finished stack and to grasp the succeeding overlying sheet to hold the latter in vertically spaced, fixed relation to said upper sheet, and an auxiliary table movable in following relation to said clamping means through the opening provided thereby between the stack on said main table and said succeeding overlying sheet, to thereby provide a support for the oncoming sheets during the period of unloading of said main table.

9. In a layboy adapted to form a stack of lightweight paper sheets as the latter are delivered thereto in succession, a main receiving table, means for lowering said main table in accordance with the rate of building up the stack, clamping means comprising a plurality of arms movable into overlying engagement with the upper sheet on the stack as the latter is completed, each of said arms including a pair of laterally spaced portions having openings through the upper surface thereof in position for contact with the facing surface of the succeeding paper sheet, an internal bore defined by each of said arm portions and having communication with said opening, suction means communicating with said bores to thereby enable said arms to grasp an edge portion of the lower sheet of those following the finished stack to hold said lower sheet in vertically spaced, fixed relation to said finished stack, and an auxiliary table comprising a plurality of elongated, spaced-apart members each movable between a pair of said arm portions, to thereby provide a support for the succeeding sheets above said completed pile during the period of unloading of said main table.

10. In a layboy adapted to form a stack from sheet material being successively fed thereto, a main receiving table, means for lowering said main table as the height of the stack increases, to thereby maintain the upper surface of the forming stack at a substantially constant level, said lowering means being operable to lower said stack below said constant level when the stack reaches a predetermined height, clamping means movable into overlying engagement with said stack as the latter is completed and lowered below said constant level, said clamping means including means for engaging and holding the succeeding sheet in vertically spaced relation to the upper sheet of the completed stack, and an auxiliary table movable through the opening formed by said clamping means between the completed stack and said succeeding sheet, to thereby support said succeeding sheet and the sheets following same into the layboy while said completed stack is removed from said main table.

11. In a layboy adapted to form a stack from pieces of sheet material being successively fed thereto, a vertically movable main receiving table, means for raising and lowering said main table, said means including control means disposed in the path of vertical movement of said main table and responsive to the disposition of the top of the stack of sheets being formed thereon to effect a lowering of said main table as the sheets are delivered thereto, to thereby maintain the top of the stack at a substantially constant level, said control means being further responsive to the completion of the formation of a stack of predetermined heights to effect a lowering of said main table so as to position the top of the stack below said constant level, clamping means movable into overlying engagement with said stack as the latter is completed and lowered below said constant level, and an auxiliary table movable into a position overlying said completed stack for support of succeeding sheets being fed to said layboy while said completed stack is removed from said main table.

12. In a layboy adapted to continuously form stacks containing a predetermined quantity of pieces of sheet material which are successively fed thereto, a vertically movable main table for receiving the sheets, means for raising and lowering said main table, said means including control means disposed in the path of vertical movement of said main table and responsive to the disposition of the stack of sheets being formed thereon to effect a gradual lowering of said main table, to thereby maintain the top of the stack at a substantially constant level during the formation of the stack, said control means being further responsive to the attainment of a stack of predetermined height on said main table to effect a sudden lowering of said table to thereby place the top of the completed stack below said constant level, clamping means movable into overlying engagement with said stack, means for moving said clamping means into said position of engagement with said stack after said control means has effected said sudden lowering of said main table to thereby provide an opening between the top of said stack and the succeeding sheet, and an auxiliary table movable through the opening thus provided into a position overlying said completed stack, whereby said auxiliary table provides a support for the succeeding sheets which are being fed to said layboy while said completed stack is being removed from said main table.

13. In a layboy adapted to continuously form stacks from pieces of sheet material being successively fed thereto, an auxiliary stack support means comprising means disposed for movement relative to a position overlying an upper edge portion of a stack formed in the layboy, said latter means being operable to grasp an edge portion of a succeeding sheet being fed to the layboy to hold said edge portion in vertically spaced, fixed relation to said formed stack, and a support element movable through the opening provided by said latter means between the formed stack and the succeeding sheet to a position overlying said stack.

14. In a layboy adapted to continuously form stacks from pieces of sheet material being successively fed thereto, an auxiliary stack support comprising means disposed for movement relative to a position overlying the top of a stack formed in the layboy, said means including an element having an opening in the upper surface thereof having communication with a source of vacuum, whereby said element is operable to provide suction at said upper surface to grasp a succeeding sheet being fed to the layboy and to hold said succeeding sheet in vertically spaced relation to said formed stack, and a support means movable through the opening provided by said element between the formed stack and the succeeding sheet to a position overlying said stack.

15. In a layboy adapted to continuously form stacks from pieces of sheet material being successively fed thereto, an auxiliary stack support comprising, means disposed for movement relative to a position overlying the top of a stack formed in the layboy to thereby provide an opening between the top of the stack and the succeeding sheet, a support means movable through the opening provided by said first mentioned means to a position overlying said stack for support of the succeeding sheets, and an element carried by said first means for vertical swinging movement, said element being operative in response to the entry of said support means into the opening provided between the stack and the succeeding sheet to move downwardly into engagement with said stack to hold down the upper sheets thereon.

16. In a layboy adapted to continuously form stacks from pieces of sheet material being successively fed thereto, an auxiliary stack support comprising means disposed to movement relative to a position overlying the top of a stack formed in the layboy, said means including a first element having an opening in the upper surface thereof having communication with a source of vacuum, whereby said first element is operable to provide suction at said upper surface thereof to grasp a succeeding sheet being fed to the layboy and hold said succeeding sheet in vertically spaced relation to said formed stack, a support means movable through the opening provided by said first element between the formed stack and the succeeding sheet, and a second element pivotally mounted on said first mentioned means for vertical movement, said second element being disposed in the path of said movable support means for engagement thereby to effect a downward movement of said second element to a position of engagement with said formed stack, whereby the upper sheets of said formed stack are held in position while said support means moves across said formed stack to provide a support for the succeeding sheets.

References Cited in the file of this patent

UNITED STATES PATENTS

| | | |
|---|---|---|
| 930,097 | Sheldon | Aug. 3, 1909 |
| 2,205,767 | Lamb | June 25, 1940 |
| 2,375,241 | Lindgren | May 8, 1945 |
| 2,521,075 | Matthews | Sept. 5, 1950 |
| 2,675,747 | Greiner | Apr. 20, 1954 |

UNITED STATES PATENT OFFICE
CERTIFICATE OF CORRECTION

Patent No. 2,853,299 September 23, 1958

Peter J. Link et al.

It is hereby certified that error appears in the printed specification of the above numbered patent requiring correction and that the said Letters Patent should read as corrected below.

Column 1, line 47, for "laybody" read -- layboy --; column 2, line 47, for "seupport" read -- support --; line 68, strike out "conveyor. As noted in Figure 4, the carrier belts 38 are" and insert the same after the words "along the", in line 64, and before the words "each disposed" in line 65; column 6, line 37, for '"I,"' read -- "I",--; column 12, line 6, for "disposed to" read -- disposed for --.

Signed and sealed this 20th day of January 1959.

(SEAL)

Attest:

KARL H. AXLINE
Attesting Officer

ROBERT C. WATSON
Commissioner of Patents